US009254884B2

(12) United States Patent
Jessie, Jr. et al.

(10) Patent No.: US 9,254,884 B2
(45) Date of Patent: Feb. 9, 2016

(54) WHEEL MECHANISM FOR CONVERTING A CHILD VEHICLE BETWEEN MULTIPLE CONFIGURATIONS AND ASSOCIATED METHOD

(71) Applicant: Huffy Corporation, Centerville, OH (US)

(72) Inventors: Donald K. Jessie, Jr., Middletown, OH (US); Andrew Bean, Cincinnati, OH (US)

(73) Assignee: Huffy Corporation, Centerville, OH (US)

( * ) Notice: Subject to any disclaimer, the term of this patent is extended or adjusted under 35 U.S.C. 154(b) by 0 days.

(21) Appl. No.: 14/206,528

(22) Filed: Mar. 12, 2014

(65) Prior Publication Data

US 2014/0265233 A1   Sep. 18, 2014

Related U.S. Application Data

(60) Provisional application No. 61/777,357, filed on Mar. 12, 2013.

(51) Int. Cl.
 *B62K 9/02* (2006.01)
 *B62K 13/04* (2006.01)
 *B62K 9/00* (2006.01)

(52) U.S. Cl.
 CPC . *B62K 13/04* (2013.01); *B62K 9/00* (2013.01); *B62K 9/02* (2013.01); *Y10T 29/49716* (2015.01)

(58) Field of Classification Search
 CPC ............. B62K 9/02; B62K 13/04; B62K 9/13
 USPC ......... 280/282, 30, 7.1, 278, 287, 43.16, 7.15
 See application file for complete search history.

(56) References Cited

U.S. PATENT DOCUMENTS

| | | | |
|---|---|---|---|
| 6,530,589 B1* | 3/2003 | Ma | 280/278 |
| 6,575,486 B2* | 6/2003 | Ma | 280/287 |
| 7,597,331 B2* | 10/2009 | Schulte et al. | 280/7.15 |
| 8,262,114 B2* | 9/2012 | Jessie, Jr. | 280/279 |
| 2006/0175109 A1* | 8/2006 | Cheng | B62H 1/12 180/219 |
| 2008/0001374 A1* | 1/2008 | Liao | 280/62 |
| 2010/0253035 A1* | 10/2010 | Miroewski | 280/200 |

* cited by examiner

*Primary Examiner* — Anne Marie Boehler
*Assistant Examiner* — Marlon Arce
(74) *Attorney, Agent, or Firm* — Wood, Herron & Evans, LLP

(57) ABSTRACT

A wheel converting mechanism for a child vehicle having a wheel includes an elongate body having a first portion, a second portion, and a third portion, wherein the third portion of the elongate body is configured to be coupled to the wheel of the child vehicle. The first portion and second portion are coupled together through a pivot joint that allows the second portion to pivot relative to the first portion about a pivot axis defined by the pivot joint. Additionally, the second portion and the third portion are coupled together through a swivel joint that allows the third portion to rotate relative to the second portion about a swivel axis defined by the swivel joint. A method of moving a wheel of a child vehicle is also disclosed.

23 Claims, 7 Drawing Sheets

WHEEL MECHANISM FOR CONVERTING A CHILD VEHICLE BETWEEN MULTIPLE CONFIGURATIONS AND ASSOCIATED METHOD

CROSS-REFERENCE TO RELATED APPLICATIONS

This application claims the benefit of U.S. Provisional Application Ser. No. 61/777,357 filed Mar. 12, 2013, the disclosure of which is expressly incorporated by reference herein in its entirety.

TECHNICAL FIELD

The invention relates to a child vehicle, and more particularly to a child vehicle having a wheel converting mechanism that allows the child vehicle to convert between a first configuration, such as a tricycle, to a second configuration, such as a bicycle, and vice versa.

BACKGROUND

For generations, children have enjoyed riding on a whole host of child vehicles. Many children start with foot-to-floor vehicles, wherein the children shuffle their feet across the floor to propel the vehicle in a forward or reverse direction. After mastering the foot-to-floor vehicle, many children graduate to a tricycle, wherein the three-wheeled configuration provides stability as the child learns to propel the vehicle through pedaling. As the child continues to grow and advance in skill, the child may graduate to a bicycle, wherein the child will have to learn to balance himself or herself on the bicycle as the bicycle is pedaled in a forward direction.

When the child is ready to move from one child vehicle, such as the tricycle, to another child vehicle, such as the bicycle, the parents or guardians of the child often have to purchase a new vehicle, as many existing vehicles are designed only as a single configuration vehicle, i.e., the vehicle is either designed as a tricycle or designed as a bicycle. Manufacturers have struggled with this transition and have proposed various solutions that provide a vehicle having multiple configurations. For example, training wheels are a common item for children learning how to ride a bicycle, for example. As is well known, training wheels are often attached adjacent to and on either side of the rear wheel of the bicycle. This configuration then gives three points of contact on the rear of the vehicle. While this arrangement aids in balancing the child on the vehicle, precise alignment is required to prevent the vehicle from rocking back-and-forth and/or maintaining engagement of the rear wheel with the ground as the vehicle traverses the terrain. These shortcomings of training wheels are inconvenient for the parent or guardian, who generally must remain close to the child as he or she rides.

Another solution posed by manufactures includes providing a plurality of rear wheels which may be mounted or dismounted from the vehicle depending on what type of vehicle is desired. If a tricycle configuration is desired, then two rear wheels must be mounted onto the rear of the vehicle. This often requires a set of tools, such as wrenches, for example, and some amount of assembly, such as bolting or the like. If it is desired to change the vehicle to a bicycle, then the two rear wheels must be dismounted from the vehicle and a single rear wheel mounted to the vehicle. The single wheel is often mounted in a different location from each of the two rear wheels in the tricycle configuration. Similarly, this requires tools, disassembly steps, and assembly steps. Parents or guardians may find the need for tools, as well as the assembly/disassembly processes in changing the vehicle configuration inconvenient. Additionally, this solution often requires the parents/guardians to keep track of parts when not in use (e.g., one or more wheels). These parts often get lost leading to loss of function in converting the vehicle and increased consumer frustration.

In still another solution, some manufacturers have proposed child vehicles having wheels which remain attached to the vehicle, but are movable so as to provide different configurations for the vehicle. By way of example, U.S. Pat. No. 7,988,168 discloses a toy vehicle having a front fork assembly with two front wheels pivotally coupled thereto and a rear fork assembly with two rear wheels pivotally coupled thereto. When the wheels are on the outside of their respective forks, the wheels operate as two separate wheels. However, when the wheels are pivoted to be inside of their respective forks, then the two adjacent wheels are close enough together that they effectively operate as a single wheel. By way of example, FIG. 1 of the '168 patent shows the vehicle in a quadcycle configuration; FIG. 6 shows the vehicle in an inverted tricycle configuration; FIG. 7 shows the vehicle in a conventional tricycle configuration; and FIG. 8 shows the vehicle in a bicycle configuration.

While the toy vehicle disclosed in the '168 patent provides for transitioning the vehicle between various configurations, there are some drawbacks to this and other designs. In this regard, the mechanism that provides the pivotal movement of the wheels often limits the size of the wheels which may be used on the vehicle. For example, if the wheel is too large, as the wheel is pivoted from outside the fork to inside the fork, the wheel would contact the adjacent fork or wheel, and thereby be prevented from moving to its proper position. This may be demonstrated by the '168 patent by imagining replacing the wheels disclosed in the patent with wheels twice of three times as large. Such enlarged wheels would clearly not be able to pivot so as to transition between the various configurations. Because the wheels must be relatively small, such as those shown in the '168 patent, such mechanisms for providing the pivotal movement are useful on only the smallest of child vehicles, such as, for example, small foot-to-floor vehicles. These mechanisms generally cannot be used on larger child vehicles having larger diameter wheels.

Accordingly, there is a need for a wheel converting mechanism for a child vehicle and an associated method that allows the vehicle to transition between various configurations, such as between a tricycle and bicycle, without removing wheels from the vehicle and allowing larger wheels to be used on the vehicle.

SUMMARY

A wheel converting mechanism for a child vehicle having a wheel comprises an elongate body include a first portion, a second portion, and a third portion, wherein the third portion of the elongate body is configured to be coupled to the wheel of the child vehicle. The first portion and second portion are coupled together through a pivot joint that allows the second portion to pivot relative to the first portion. Additionally, the second portion and the third portion are coupled together through a swivel joint that allows the third portion to rotate relative to the second portion about a longitudinal axis defined by the third portion.

In one embodiment, the cross-sectional size of each of the first, second, and third portions is substantially the same. Moreover, the cross-sectional shape of each of the first, second, and third portions may also be substantially the same. In an exemplary embodiment, the cross-sectional shape of each of the first, second, and third portions is non-circular. More specifically, the cross-sectional shape of each portion may be polygonal, such as square. Furthermore, the wheel converting mechanism may include a retention mechanism configured to retain the wheel converting mechanism to the child vehicle. The retention mechanism may include at least one groove formed in at least one of the first, second, and third portions of the wheel converting mechanism, and a pin configured to be received in an traverse the groove in the at least one of the first, second, and third portions. In one embodiment, a groove is formed in each of the first, second, and third portions and the wheel converting mechanism has at least one position wherein each of the grooves in the respective portions are generally aligned. The third portion of the wheel converting mechanism may have a pair of grooves. Additionally, the groove in the first portion of the wheel converting mechanism may closed to define an end wall at one end thereof.

In one embodiment, the second portion is pivotal relative to the first position between a first position and a second position. When in the first position, a first longitudinal axis of the first portion is generally aligned with a second longitudinal axis of the second portion. Moreover, when in the second position, the second longitudinal axis is angled relative to the first longitudinal. In one embodiment, the angle between the first and second longitudinal axes in the second position is less than 90°. For example, in one embodiment, the first and second longitudinal axes may be angled less than about 60° in the second position. In an exemplary embodiment, the second portion of the wheel converting mechanism may be pivoted away from the first position in either a first pivoting direction or a second pivoting direction opposite to the first pivoting direction.

In an exemplary embodiment, the third portion is rotatable relative to the second portion between a first position and a second portion. In the first position, the wheel is on a first side of the third portion and when in the second position, the wheel is on a second side of the third portion opposite to the first side. For example, in one embodiment, the third portion may be rotated through an angle of approximately 180° from the first position to the second position. The third portion may be rotated away from the first position in either a first rotating direction or a second rotating direction opposite to the first rotating direction.

The wheel converting mechanism may further include a locking mechanism for securing the wheel converting mechanism to the child vehicle. In an exemplary embodiment, the locking mechanism may include a depressible spring pin projecting from a surface of the wheel converting mechanism. More specifically, the locking mechanism may include a spring pin in the third portion of the wheel converting mechanism. In one embodiment, the spring pin may be circumferentially offset from the groove in the third portion by about 90°.

In another embodiment, a child vehicle having a wheel includes at least one from including a bracket and a wheel converting mechanism coupled to the bracket of the at least one frame and configured to reposition the wheel relative to the at least one frame. The wheel converting mechanism includes an elongate body include a first portion, a second portion, and a third portion, wherein the third portion of the elongate body is configured to be coupled to the wheel of the child vehicle. The first portion and second portion are coupled together through a pivot joint that allows the second portion to pivot relative to the first portion. Additionally, the second portion and the third portion are coupled together through a swivel joint that allows the third portion to rotate relative to the second portion about a longitudinal axis defined by the third portion. In this embodiment, the wheel converting mechanism is movable between a first position and a second position relative to the bracket. When in the first position, the wheel is on a first side of the bracket, and when in the second position, the wheel is on a second side of the bracket opposite to the first side. In an exemplary embodiment, the wheel converting mechanism is configured to reposition the wheel without separating the wheel converting mechanism from the vehicle.

The vehicle may further include a retention mechanism configured to retain the wheel converting mechanism to the child vehicle. In one embodiment, the retention mechanism includes at least one groove formed in at least one of the first, second, and third portions of the wheel converting mechanism, and a pin coupled to the bracket and received in the groove in the at least one of the first, second, and third portions. The pin is configured to engage an end wall of the groove to prevent the wheel converting mechanism from separating from the bracket.

In an exemplary embodiment, the bracket includes a hollow tube and the wheel converting mechanisms is at least partially telescopingly received within the hollow tube. The wheel converting mechanism is movable relative to the bracket between a first position, wherein when in the first position, the swivel joint is located within the bracket, and when in the second position, the pivot joint is located outside of the bracket. The child vehicle further includes a locking mechanism for securing the wheel converting mechanism in the first position. In an exemplary embodiment, the locking mechanism includes a depressible spring pin projecting from a surface of the wheel converting mechanism, and at least one bore in the bracket, wherein a portion of the spring pin projects through the at least one bore to secure the wheel converting mechanism in the first position.

In one embodiment, the at least one frame includes a fork having a first leg and a second leg, the first leg having a first bracket and the second leg having a second bracket. The vehicle further includes a first wheel converting wheel mechanism coupled to the first bracket and a second wheel converting mechanism coupled to the second bracket. In one embodiment, the fork may be the rear fork of the vehicle.

In still a further embodiment, a method of moving a wheel of a child vehicle includes moving a wheel converting mechanism relative to a bracket of the child vehicle, the wheel converting mechanism having first, second, and third portions wherein the wheel is coupled to the third portion; pivoting the second portion of the wheel converting mechanism relative to the first portion; and rotating the third portion of the wheel converting mechanism relative to the second portion. In one embodiment, moving the wheel converting mechanism relative to the bracket further includes moving the wheel converting mechanism from a first position to a second position, wherein translational and rotational movements of the wheel converting mechanism relative to the bracket is prevented when in the first position, and translational and rotational movements of the wheel converting mechanism relative to the bracket is permitted when in the second position. In one embodiment, moving the wheel converting mechanism relative to the bracket further includes telescopingly withdrawing the wheel converting mechanism from the bracket by movement along a longitudinal axis. The movement of the wheel converting mechanism relative to the bracket in an exemplary embodiment includes maintaining at least a portion of the wheel converting mechanism in contact with the bracket at all times. The method may include releasing a locking mechanism to allow movement of the wheel converting mechanism relative to the bracket.

In one embodiment, the first and second portions have respective first and second longitudinal axes and the step of pivoting the second portion relative to the first portion further includes pivoting the second portion from a first position to a second position about a pivot axis generally perpendicular to the first and second longitudinal axes. In an exemplary embodiment, the first longitudinal axis is generally aligned with the second longitudinal axis when in the first position, and the first longitudinal axis has a non-parallel relationship with the second longitudinal axis when in the second position. In one embodiment, the pivoting may be through an angle less than about 90°, such as, for example, through an angle of less than about 60°. In one embodiment, the step of rotating the third portion relative to the second portion is performed after pivoting the second portion relative to the first portion.

In accordance with the method, the second and third portions have respective second and third longitudinal axes, wherein rotating the third member relative to the second member further comprises rotating the third member from a first position to a second position about a pivot axis generally parallel to the second and third longitudinal axes. In one embodiment, the second longitudinal axis is generally aligned with the third longitudinal axis when in the first and second positions. In one embodiment, rotating the third portion relative to the second portion further includes rotating the third portion relative to the second portion through an angle of about 180°.

The method may further include again pivoting the second member of the wheel converting portion relative to the first portion, and again moving the wheel converting mechanism relative to the bracket of the child vehicle. A locking mechanism may be engaged subsequent to again moving the wheel converting mechanism relative to the bracket.

A method of converting a child vehicle from a first configuration to a second configuration is disclosed. The child vehicle has a fork with a first leg having a first bracket and a second leg having a second bracket. A first wheel is coupled to the first bracket by a first wheel converting mechanism and a second wheel is coupled to the second bracket by a second wheel converting mechanism. Each wheel converting mechanism includes a first, second, and third portion, wherein the wheel is coupled to the third portion. The method includes: i) moving the first wheel converting mechanism relative to the first bracket between a first position to a second position; ii) pivoting the second portion of the first wheel converting mechanism relative to the first portion of the first wheel converting mechanism from a first position to a second position; iii) rotating the third portion of the first wheel converting mechanism relative to the second portion of the first wheel converting mechanism from a first portion to a second position; iv) pivoting the second portion of the first wheel converting mechanism relative to the first portion of the first wheel converting mechanism from the position to the first position; and v) moving the first wheel converting mechanism relative to the first bracket between the second position to the first position. The steps i)-v) may move the first wheel from an inboard side of the first leg to an outboard side of the first leg, or vice versa.

The method may further include: i) moving the second wheel converting mechanism relative to the second bracket between a first position to a second position; ii) pivoting the second portion of the second wheel converting mechanism relative to the first portion of the second wheel converting mechanism from a first position to a second position; iii) rotating the third portion of the second wheel converting mechanism relative to the second portion of the second wheel converting mechanism from a first portion to a second position; iv) pivoting the second portion of the second wheel converting mechanism relative to the first portion of the second wheel converting mechanism from the position to the first position; and v) moving the second wheel converting mechanism relative to the second bracket between the second position to the first position. The steps i)-v) may move the second wheel from an inboard side of the second leg to an outboard side of the second leg, or vice versa.

In one embodiment, the method may be used to convert the child vehicle from a tricycle configuration to a bicycle configuration. Alternatively, the method may be used to convert the child vehicle from a bicycle configuration to a tricycle configuration.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
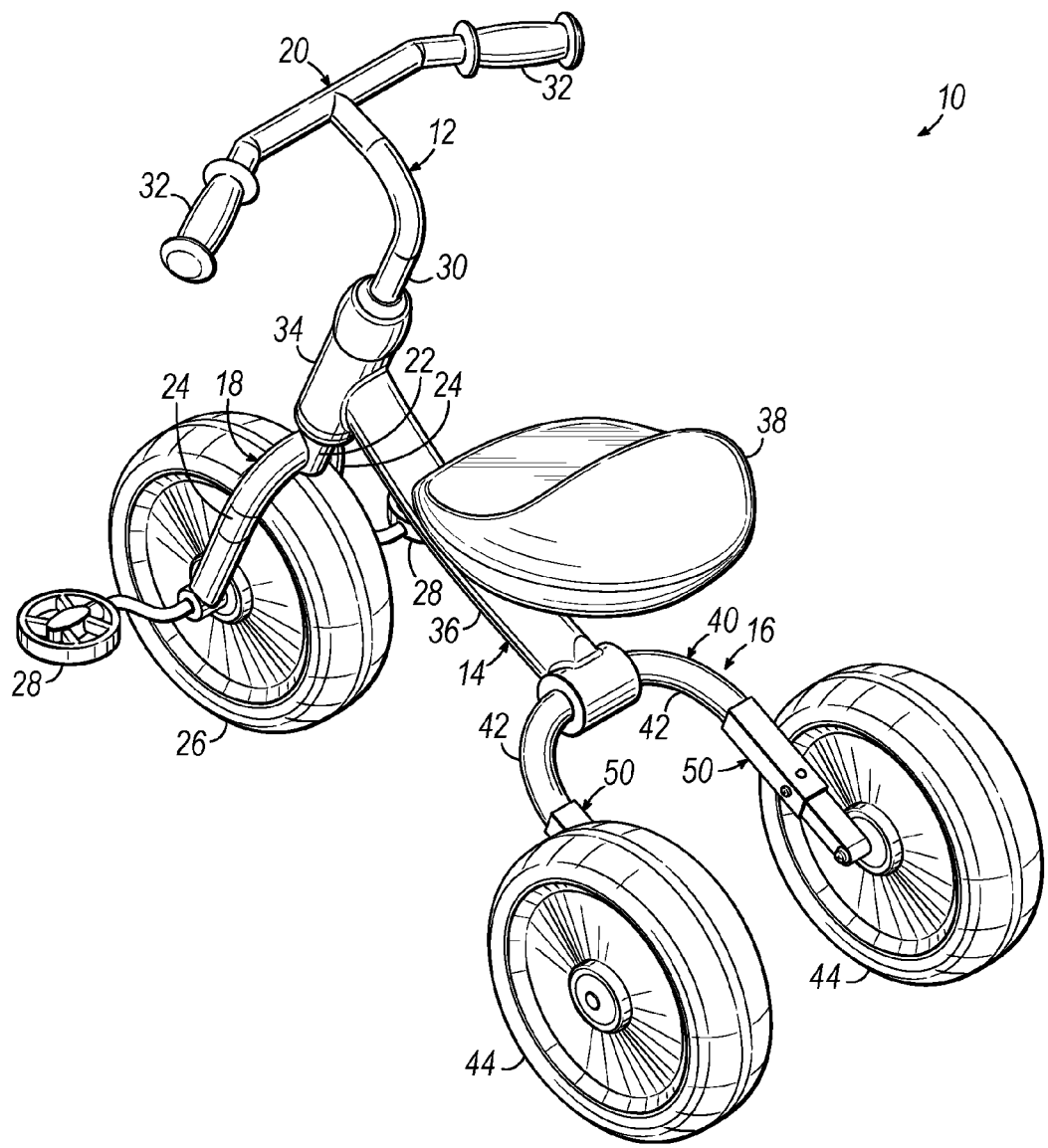
FIG. 1 is a perspective view of a child vehicle in accordance with an embodiment of the invention in a tricycle configuration.
Figure 2:
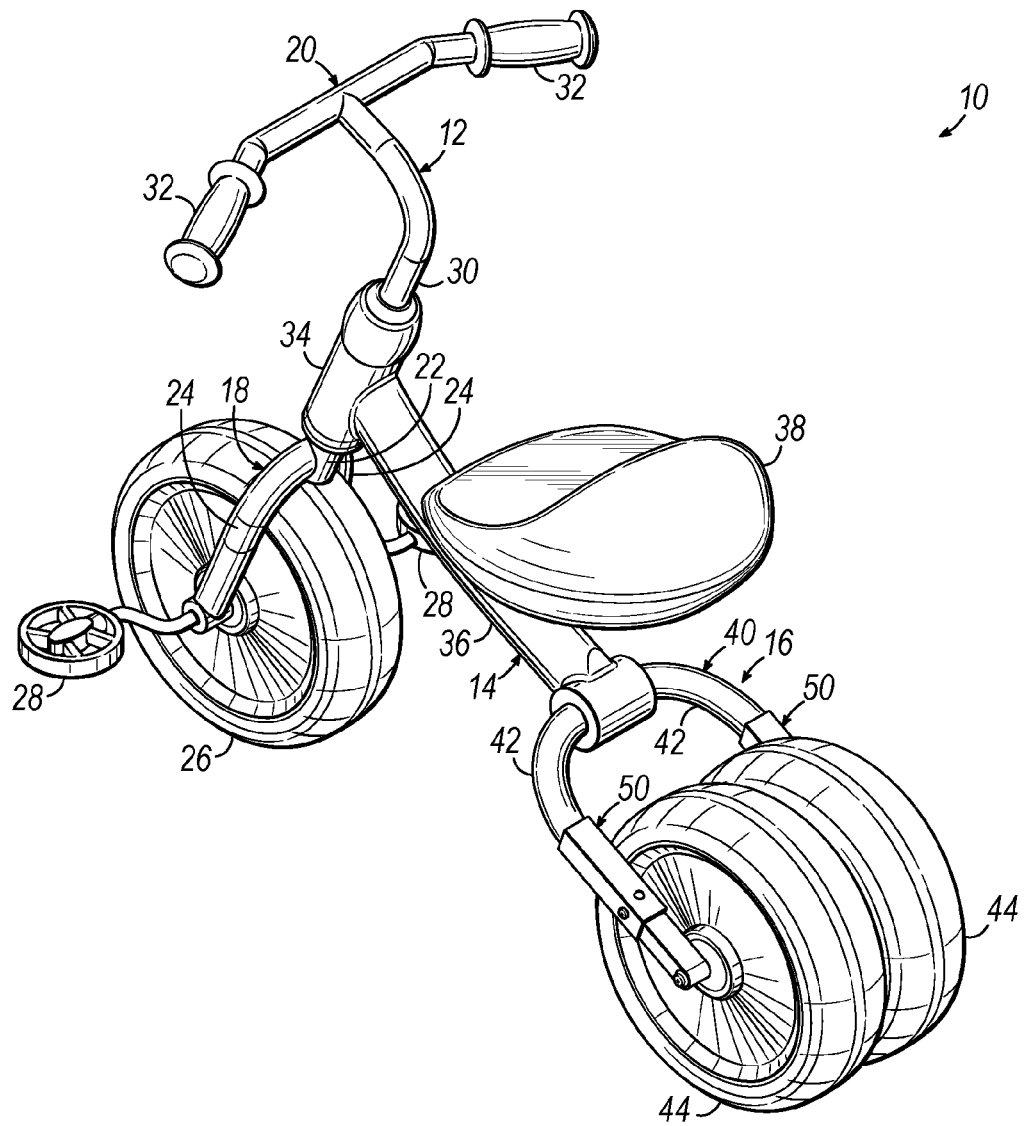
FIG. 2 is another perspective view of the child vehicle of FIG. 1 in a bicycle configuration.

Referring now to the drawings and to FIGS. 1 and 2 in particular, a child vehicle 10 in accordance with an exemplary embodiment of the invention is shown. The vehicle 10 includes a front frame 12, a middle frame 14, and a rear frame 16. The front frame 12 includes a front fork 18 operatively coupled to a handlebar 20. The front fork 18 includes a fork stem 22 and a pair of spaced apart forks or legs 24 extending therefrom in a generally parallel fashion. A front wheel 26, which defines a front axle, is positioned between the legs 24 and rotatably coupled thereto so as to allow rotation of the front wheel 26 relative to the front frame 12. A pair of pedals 28 are positioned outboard of the legs 24 of front fork 18 and are operatively coupled to the front wheel 26 (e.g., such as by being coupled to the front axle) for allowing the rider to rotate the front wheel 26, and consequently, propel the vehicle 10 in a certain direction dictated by handlebar 20.

The handlebar 20 includes a handlebar stem 30 configured to be coupled to the fork stem 22, and may include a pair of handles 32 configured to be grasped by the rider for turning the vehicle 10 in a desired direction. The handles 32 may include grips or other features that facilitate gripping by the user. Those of ordinary skill in the art will recognize that the handlebar 20 may have a wide variety of shapes and designs and the invention is not limited to the particular embodiment shown herein.

The middle frame 14 includes a head tube 34 configured to be coupled to the front frame 12, one or more frame support elements 36, and a seat 38 coupled to at least one of the frame support elements 36. The middle frame 14 may further include a shell or manifold (not shown) enclosing much of the middle frame 14 and providing an aesthetic aspect to the vehicle 10. The front frame 12, and more particularly at least one of the fork stem 22 and handlebar stem 30, is configured to be inserted through the head tube 34 and rotatably mounted thereto so as to allow the front frame 12 to rotate relative to the middle frame 14, and thereby change the direction of the vehicle 10 through the rotation of handlebar 20. Lastly, the rear frame 16 is coupled to the middle frame 14, such as by a fixed coupling or a pivotal coupling (such that the vehicle 10 is foldable) and includes a rear fork 40 having a pair of spaced apart support elements or legs 42 extending generally in parallel fashion. Each leg 42 includes a rear wheel 44 rotatably coupled adjacent an end thereof so as to allow rotation of the rear wheels 44 relative to the rear frame 16. Thus, the vehicle 10 includes two wheels 44 on the rear of the vehicle 10.

As illustrated in FIGS. 1 and 2, in accordance with an embodiment of the invention, the child vehicle 10 may be configured to be convertible between at least two configurations. By way of example, FIG. 1 illustrates the child vehicle 10 in the form of a tricycle, while FIG. 2 illustrates the child vehicle 10 in the form of a bicycle. When the vehicle 10 is in the tricycle configuration, each of the rear wheels 44 may be positioned on the outboard side of the respective leg 42 to which the wheel is attached. The rear wheels 44 are sufficiently spaced apart such that the wheels 44 effectively represent two separate wheels of the vehicle 10, thus forming the tricycle configuration in combination with the single front wheel 26. In contrast to this, when the vehicle 10 is in the bicycle configuration, each of the rear wheels 44 is positioned on the inboard side of the respective leg 42 to which the wheel is attached. In this case, the rear wheels 44 are immediately adjacent to each other such that the wheels 42 effectively represent a single wheel of the vehicle 10, thus forming the bicycle configuration in combination with the single front wheel 26. For two wheels to be effectively considered as a single wheel, the wheels should not be spaced apart any more than about ¼ of an inch (about 6.35 mm). For example, in an exemplary embodiment, the two rear wheels 44 may be in side-by-side abutting contact with each other.

In one aspect of the invention, the conversion of the child vehicle 10 between the tricycle and bicycle configurations illustrated in FIGS. 1 and 2, respectively, is achieved without completely uncoupling or removing the wheels 44 from the vehicle 10. In other words, the wheels 44 remain coupled to the vehicle 10 at all times during the conversion between the various configurations of the vehicle. In this regard, the rear wheels 44 are configured to be movable relative to the vehicle 10 while remaining coupled to the vehicle so as to position the wheels 44 inboard and outboard of the respective legs 42 to which the wheels 44 are coupled. Moreover, vehicle 10 is further configured to achieve this conversion in the manner described above for wheels that are, at least relative to existing systems, fairly large in diameter. By way of example, it is contemplated that wheels having a radius which is about equal to or greater than the fixed spacing between the two rear legs 42 may be used on the vehicle 10. The ability to use this concept on vehicles having larger wheels provides a greater variety of vehicles to which this feature of convertibility may be applied. In other words, the wheel-size limitations hindering prior convertible vehicle designs have been addressed by aspects of the present invention.

Figure 3:
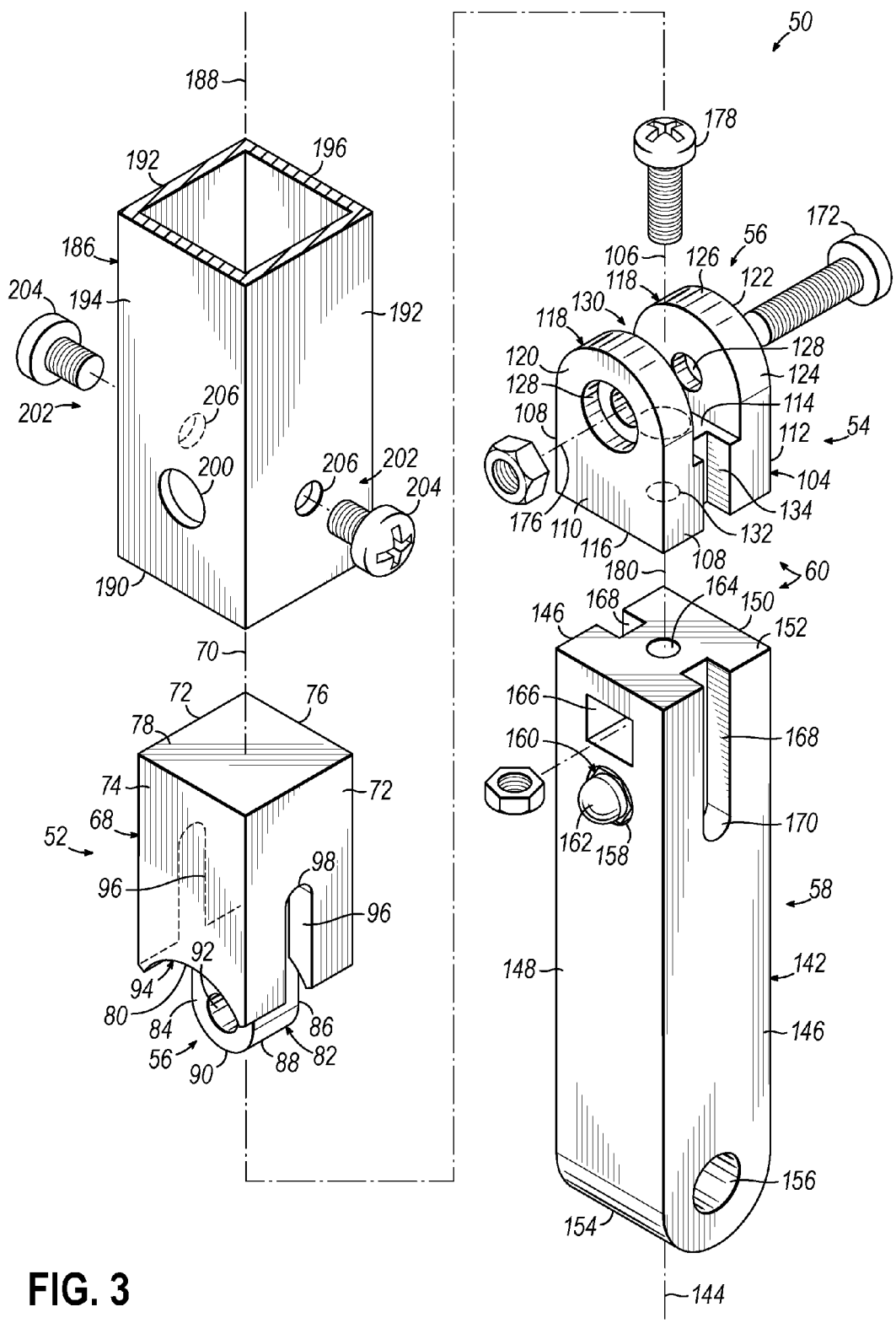
FIG. 3 is a disassembled perspective view of a wheel converting mechanism in accordance with an embodiment of the invention.

FIG. 3 illustrates a disassembled perspective view of a wheel converting mechanism 50 in accordance with an exemplary embodiment of the invention. The wheel converting mechanism 50 is a multi-piece assembly that defines at least two joints which permit relative movement between various portions of the mechanism 50. In this regard and as illustrated in FIG. 3, the wheel converting mechanism 50 includes a first base member 52, a second intermediate hinge member 54 coupled to the first base member through a hinge joint 56, and a third swivel member 58 coupled to the hinge member 54 through a swivel joint 60. The configuration of the various members and the particular coupling of the members to an adjacent member so as to achieve the desired movement of the rear wheels 44 relative to their respective legs 42 will now be described in more detail.

In an exemplary embodiment, the base member 52 may be configured as a generally block-shaped main body 68 extending along a longitudinal axis 70 and having a polygonal cross-sectional shape. For example, in one embodiment, the base member 52 may have a generally square cross section, however other cross-sectional shapes, such as rectangular, triangular, pentagonal, octagonal, may also be used. For reasons discussed below, it is preferable that the cross-section of the base member 52 be non-circular. This geometry generally defines a pair of side walls 72, a top wall 74, a bottom wall 76, a first end wall 78, and a second end wall 80. In an exemplary embodiment, at least the top wall 74, bottom wall 76 and side walls 72 may define generally planar surfaces. The first end wall 78 may also define a generally planar surface in an exemplary embodiment. However, in one embodiment the second end wall 80 may be configured as a generally arcuate wall when viewed, for example, from the top or bottom.

In one embodiment, a tang or ear 82 may project away from the second end wall 80 generally along the longitudinal axis 70 and may generally include a top wall 84, a bottom wall 86, and a side wall 88 extending therebetween. The top and bottom walls 84, 86 of the ear 82 may be generally planar and may be generally parallel to the top and bottom walls 74, 76 of main body 68. The side wall 88 of the ear 82 adjacent an end portion thereof may be configured as a generally arcuate portion 90. A through bore 92 may extend through the ear 82 from the top wall 74 to the bottom wall 76 and define an axis that is generally perpendicular to the longitudinal axis 70 of main body 68. The thickness of the ear 82 from the bottom wall 86 to the top wall 84 is less than the thickness of the of the main body 68 from the bottom wall 76 to the top wall 74 so as to define cut outs or cavities 94 above and below the ear 82 and at least partially defined or bounded by a portion of the arcuate second end wall 80. The purpose of these cavities 94 and the associated geometries will be explained below.

Furthermore, a groove 96 may be centrally formed in one or both of the side walls 72 of the main body 68 and extend from the second end wall 80 toward the first end wall 78 so as to define a groove axis that is generally parallel to the longitudinal axis 70 of the main body 68. The groove(s) 96 may be open to the second end wall 80, but stop short of the first end wall 78 and terminate at a first stop or bounding wall 98. The depth of the groove(s) 96 is such that the bottom wall of the groove(s) 96 may be flush with the side wall 88 of the ear 82 at the point where the ear 82 intersects the second end wall 80. Moreover, in an exemplary embodiment, the height of the groove(s) 96 may be generally less than the thickness of the ear 82. The base member 52 may be made from any suitable material including metal, such as steel, or various engineering plastic materials configured to withstand the anticipated loads thereon.

The hinge member 54 may be configured similar to the base member 52 and include a generally block-shaped main body 104 extending along a longitudinal axis 106 and having a polygonal cross-sectional shape. For example, in one embodiment, the hinge member 54 may have a generally square cross section, however other cross-sectional shapes, such as rectangular, triangular, pentagonal, octagonal, may also be used. In an exemplary embodiment, and for reasons made clear below, the cross-sectional shape and size of the main body 104 may be configured to be substantially the same as the cross-sectional shape and size of the main body 68 of the base member 52. Similar to the above, this geometry generally defines a pair of side walls 108, a top wall 110, a bottom wall 112, a first end wall 114, and a second end wall 116. In an exemplary embodiment, all of the walls 108, 110, 112, 114, and 116 may define generally planar surfaces.

In one embodiment, a pair of ears 118 may project away from the first end wall 114 generally along the longitudinal axis 106, wherein each ear 118 may generally include a top wall 120, a bottom wall 122, and a side wall 124 extending therebetween. The top and bottom walls 120, 122 of ears 118 may be generally planar and have a wall generally parallel to and flush with the top and bottom walls 110, 112 of the main body 104. The side wall 124 of the ears 118 adjacent an end portion thereof may be configured as a generally arcuate portion 126. A through bore 128 may extend through each of the ears 118 from the top wall 120 to the bottom wall 122 and define an axis that is generally perpendicular to the longitudinal axis 106 of the main body 104. The thickness of the ears 118 is such that a generally open cavity 130 is defined between the two ears 118 and is at least partially bounded by the first end wall 114.

Additionally, a through bore 132 may extend through a central portion of the main body 104 from the first end wall 114 to the second end wall 116 and define an axis that is generally parallel to the longitudinal axis 106 of the main body 104. The cross dimension (e.g., diameter) of the through bore 132 adjacent the second end wall 116 may be smaller than the cross dimension of the through bore 132 adjacent the first end wall 114. This configuration of the through bore 132 allows a suitable fastener to be countersunk within the main body 104 of the hinge member 54. Furthermore, a groove 134 may be centrally formed in one or both of the side walls 108 of the main body 104 and extends from the first end wall 114 to the second end wall 116 so as to define a groove axis that is generally parallel to the longitudinal axis 106 of the main body 104. The depth of the groove(s) 134 is such that the grooves do not intersect with the through bore 132 in the main body 104. Moreover, in an exemplary embodiment, the height of the groove(s) 134 is generally less than the spacing between the two ears 118 and may be generally equal to the height of the groove(s) 96 in the base member 52. The hinge member 54 may be made from any suitable material including metal, such as steel, or various engineering plastic materials configured to withstand the anticipated loads thereon.

The swivel member 58 may be configured similar to the base member 52 and hinge member 54 and include a generally block-shaped main body 142 extending along a longitudinal axis 144 and having a polygonal cross-sectional shape. For example, in one embodiment, the swivel member 58 may have a generally square cross section, however other cross-sectional shapes, such as rectangular, triangular, pentagonal, octagonal, may also be used. In an exemplary embodiment, and for reasons made clear below, the cross-sectional shape and size of the main body 142 may be configured to be the same as the cross-sectional shape and size of the main body 68 of the base member 52 and the main body 104 of the hinge member 54. Similar to the above, this geometry generally defines a pair of side walls 146, a top wall 148, a bottom wall 150, a first end wall 152, and a second end wall 154. In an exemplary embodiment, the side walls 146, top wall 148, bottom wall 150 and first end wall 152 may define generally planar surfaces. In one embodiment, however, the second end wall 154 may be generally arcuate.

In one embodiment, the swivel member 58 may include a through bore 156 extending through a central portion of the main body 142 between the side walls 146 and adjacent the arcuate second end wall 154 of the main body 142. The through bore 156 defines an axis that is generally perpendicular to the longitudinal axis 144 of the main body 142. The through bore 156 is configured to receive a portion of the rear wheel 44, such as a wheel stem or portion of the rear axle, therein for securing the rear wheel 44 to the wheel converting mechanism 50 using, for example, a suitable screw or other fastener.

In one embodiment, the swivel member 58 further includes another through bore 158 extending through the main body 142 from the top wall 148 to the bottom wall 150 and adjacent the first end wall 152 of the main body 120. The through bore 158 defines an axis that is generally perpendicular to the longitudinal axis 144 of the main body 142. For purposes that will be discussed below, the through bore 158 is configured to receive a spring pin 160 therein having a button 162 accessible for depressing the spring pin 160. In the normal state of the spring pin 160, at least a portion of the spring button 162 extends above the top wall 148 of the main body 142 of the swivel member. However, the spring pin 160 is depressible such that the button 162 is even with or below the top wall 148 of the main body 142.

The swivel member 58 may include yet another through bore 164 extending through a central portion of the main body 142 from the first end wall 152 toward the second end wall 154 to define an axis that is generally parallel to the longitudinal axis 144. Furthermore, the swivel member 58 may include a channel 166 extending from at least one of the top or bottom wall 148, 150 toward the other of the top or bottom wall to define an axis that is generally perpendicular to the longitudinal axis 144 of the main body 142. The channel 166 may be adjacent the first end wall 152 and adjacent the through bore 158. In one embodiment, the channel 166 may extend all the way between the top and bottom walls 148, 150. Alternatively, the channel 166 may not extend fully between the two walls. In one embodiment, the channel 166 may have a generally square or rectangular shape, although other shapes may be possible. Importantly, however, the channel 166 is positioned along the main body 142 such that the through bore 164 and the channel 166 intersect each other in the interior of the main body 142 (e.g., a T intersection). The purpose of this will be described below.

Furthermore, a groove 168 may be centrally formed in each of the side walls 146 of the main body 142 and extend from the first end wall 152 toward the second end wall 154 so as to define a groove axis that is generally parallel to the longitudinal axis 144 of the main body 142. The grooves 168 may be open to the first end wall 152, but stop short of the second end wall 154 and terminate at a second stop or bounding wall 170. The depth of the grooves 168 is such that the grooves do not intersect with the through bore 164 or the channel 166 in the main body 142. In one embodiment, the depth of the grooves 168 may be substantially the same as the depth of the grooves 96 in the hinge member 54. The height of the grooves 168 may also be substantially the same as the height of the grooves 96 in the hinge member 54. The swivel member 58 may be made from any suitable material including metal, such as steel, or various engineering plastic materials configured to withstand the anticipated loads thereon.

The particular coupling of the members of the wheel converting mechanism 50 will now be described in more detail. As noted above, the hinge member 54 is configured to be coupled to the base member 52 at hinge joint 56. In this regard, the hinge member 54 may be oriented and positioned relative to the base member 52 such that the ears 118 projecting from the first end wall 114 of the hinge member 54 are received in the cavities 94 of the base member 52, and the ear 82 projecting from the second end wall 80 of the base member 52 is received in the cavity 130 between the ears 118 of the hinge member 54. When so positioned, the through bores 128 in the ears 118 of the hinge member 54 are generally aligned with the through bore 92 in the ear 82 of the base member 52 and a suitable fastener 172 may be inserted through the through bores 92, 128 to couple the two members 52, 54 together. The bores 92, 128 may have a countersunk configuration such that no portion of the fastener 172 extends above the surfaces of the base and hinge members 52, 54 and the fastener does not interfere with operation of the wheel converting mechanism 50.

The hinge joint 56 allows the hinge member 54 to pivot relative to the base member 52 about a pivot axis 176 defined by the fastener 172. The hinge member 54 has a first, straight position relative to the base member 52. In the straight position, the longitudinal axis 70 of the base member 52 is generally aligned (e.g., parallel or co-linear) with the longitudinal axis 106 of the hinge member 54, i.e., both members 52, 54 extend along a common longitudinal axis. When so aligned, the corresponding surfaces of the base member 52 and the hinge member 54 are generally flush with each other so as to lie in a common plane. For example, when in the straight position, the top wall 74 of the base member 52 is flush with and lies in the same plane as the top wall 110 of the hinge member 54. The same also applies to bottom walls 76, 112 and side walls 72, 108. This relationship is due to the cross-sectional size and shape of the main bodies 68, 106 being substantially similar to each other. Moreover, when in the straight position, the groove axis of the grooves 96 in the base member 52 may be generally aligned with the groove axis of the grooves 134 in the hinge member 54 (i.e., the grooves 96, 134 are longitudinally aligned).

Of course, the hinge member 54 further has a second, angled position relative to the base member 52 when the hinge member 54 is pivoted about the pivot axis 176 relative to the base member 52 away from the straight position. In this regard, the arcuate portion 126 of the ears 118 of the hinge member 54 and the arcuate shape of the second end wall 80 of the base member 52 cooperate so as to permit pivotal movement of the hinge member 54 relative to the base member 52 without undue interference. In an exemplary embodiment, the hinge member 54 may pivot about pivot axis 176 in either direction. For example, depending on the particular application, the hinge member 54 may be designed to be pivotable through a range of 30°, 45°, or 60° in either one or both directions of the straight position. In the angled position, the longitudinal axis 70 of the base member 52 forms an angle with the longitudinal axis 106 of the hinge member 54 (i.e., the axes 70, 106 are not parallel or co-linear). Additionally, while the top walls 74, 110 and bottom walls 76, 112 of the base and hinge members 52, 54 may remain flush and generally within the same plane when in the angled position, the same cannot be said of the side walls 72, 108 due to the pivotal movement of the hinge member 54.

As also noted above, the swivel member 58 is configured to be coupled to the hinge member 54 at swivel joint 60. The swivel joint 60 is defined by a fastener 178 that couples the swivel and hinge members 58, 54 together. For example, the fastener 178 may include a bolt having a head and an at least partially threaded stem extending therefrom, wherein the head is positionable within the through bore 132 of the hinge member 54 (e.g., in a countersunk manner) such that the stem projects away from the second end wall 116. The swivel member 58 may be oriented and positioned relative to the hinge member 54 such that the through bore 164 in the swivel member 58 is generally aligned with the through bore 132 of the hinge member 54. In this way, the stem of the fastener 178 may be received in the through bore 164 of the swivel member 58. The length of the stem is selected so that at least a portion of the stem is received within the channel 166 of the swivel member 58. Thus, a nut or the like may be positioned within the channel 166, such as through the opening in the top wall 148 of the swivel member 58, and threaded onto the stem of the fastener 178 so as to couple the swivel member 58 to the hinge member 54.

The swivel joint 60 is configured to limit relative movements between swivel member 58 and the hinge member 54 to one degree of freedom, i.e., rotations of the swivel member 58 relative to the hinge member 54 about a swivel axis 180 that is generally parallel to the longitudinal axis 144 of the swivel member 58 and the longitudinal axis 106 of the hinge member 54. While the swivel joint 60 allows the swivel member 58 to rotate about swivel axis 180 relative to the hinge member 54, it should be recognized that the longitudinal axis 106 of the hinge member 54 will always be generally aligned with the longitudinal axis 144 of the swivel member 58, i.e., both members 54, 58 extend along a common longitudinal axis.

The swivel member 58 has a first azimuthal position relative to the hinge member 54. When in the first position, the corresponding surfaces of the hinge member 54 and the swivel member 58 are generally flush with each other so as to lie in a common plane. For example, when in the first position, the top wall 110 of the hinge member 54 is flush with and lies in the same plane as the top wall 148 of the swivel member 58. The same also applies to the bottom walls 112, 150 and side walls 108, 146. This relationship is due to the cross-sectional size and shape of the main bodies 104, 142 being substantially similar to each other. Moreover, when in the first position, the groove axis of the grooves 134 in the hinge member 52 is generally aligned with the groove axis of the grooves 168 in the swivel member 58 (i.e., the grooves 134, 168 are longitudinally aligned).

The swivel member 58 is rotatable about swivel axis 180 relative to the hinge member 52 to a second azimuthal position. In an exemplary embodiment, the swivel member 58 may rotate about axis 180 in either direction and without locking or limit mechanisms. To reach the second position, the swivel member 58 may be rotated through an angle of approximately 180° in either direction. When so rotated, the swivel member 58 has essentially been flipped such that the top wall 148 is positioned where the bottom wall 150 was positioned when in the first position and vice versa. The position of the side walls 146 has also been flipped. Because the hinge member 54 and the swivel member 58 always have a common longitudinal axis, and due to the particular cross-sectional size and shape of the hinge member 54 and the swivel member 58, when in the second position, the top wall 110 of the hinge member 54 is flush with and generally lies in the same plane as the bottom wall 150 of the swivel member 58, and the bottom wall 112 of the hinge member 54 is flush with and generally lies in the same plane as the top wall 148 of the swivel member 58. The same also applies to respective side walls 108, 146 of the hinge and swivel members 54, 58. Moreover, when in the second position, the groove axis of the grooves 134 in the hinge member 52 is generally aligned with the groove axis of the grooves 168 in the swivel member 58 (however it is the opposite groove 168 of the swivel member 58 that aligns with the same groove 134 in the hinge member).

Now that the construction and coupling of the wheel converting mechanism 50 has been fully described, the use of the wheel converting mechanism 50 to convert the child vehicle 10 between multiple configurations will be discussed. The discussion will initially begin with the coupling of the wheel converting mechanism 50 to the child vehicle 10. In this regard, each of the legs 42 of the rear fork 40 includes a bracket 186 for receiving at least a portion of the wheel converting mechanism 50. In this regard, the bracket 186 may be configured as a generally hollow tubular member defining a longitudinal axis 188 having an open end 190 configured to receive a portion of the wheel converting mechanisms 50 therethrough. The interior passage of the bracket 186 may have a cross-sectional shape and size that generally corresponds to that of the wheel converting mechanism 50 (e.g., its outer profile). For example, in one embodiment, the interior passage may have a generally square cross section. However, as noted above, other cross sections may be used, so long as it generally corresponds to the cross section of the wheel converting mechanism 50. In one embodiment, the outer profile of the bracket 186 may also be generally square in cross section. This geometry generally defines a pair of side walls 192, a top wall 194, and a bottom wall 196 and in one embodiment, these walls may define generally planar surfaces. In accordance with an aspect of the invention, the cross-sectional size of the passage is just slightly larger than the outer cross-sectional size of the wheel converting mechanism 50 so that at least a portion of the wheel converting mechanism 50 may be telescopingly received within the bracket 186 via the open end 190.

Figure 4A:
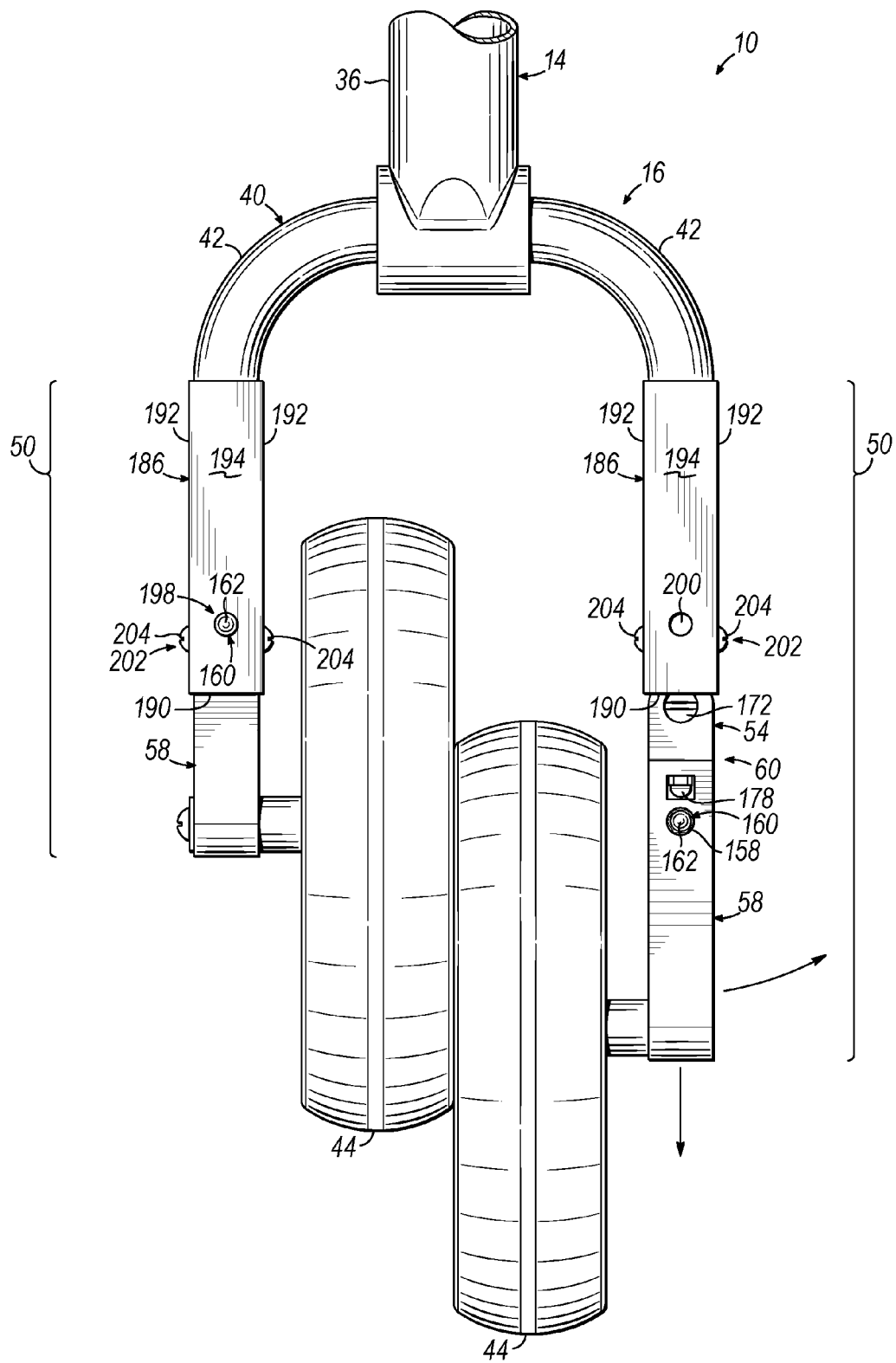
FIG. 4A is rear view of a child vehicle in a bicycle configuration being converted to a tricycle configuration using the wheel converting mechanism illustrated in FIG. 3.

As illustrated in FIG. 4A, the wheel converting mechanism 50 is capable of longitudinal movement relative to the bracket 186 (e.g., in directions generally parallel to the longitudinal axis 188 of the bracket 186) between a first retracted position and a second extended position (e.g., see left and right legs 42 in FIG. 4A). In the retracted position, a substantial portion of the wheel converting mechanism 50 may be disposed within the bracket 186. In this regard, in the retracted position, the swivel joint 60 must at least be disposed within the bracket 186. This prevents the hinge member 54 from being pivoted away from the straight position toward the angled position. Due to the non-circular cross-sectional shape of the bracket 186 (e.g., its inner passage) and the wheel converting mechanism 50, when the wheel converting mechanism 50 is inserted into the bracket 186 and in the retracted position, the wheel converting mechanism 50 is prohibited from rotating relative to the bracket 186 about a common axis defined by longitudinal axes 70, 106, and 144. Thus, the wheel converting mechanism 50 is rotationally fixed relative to the bracket 186 when in the retracted position.

Furthermore, a locking mechanism 198 may be provided to prohibit relative longitudinal movements between the bracket 186 and the wheel converting mechanism 50 when in the retracted position. In one embodiment, the spring pin 160 in the swivel member 58 of the wheel converting mechanism 50 may form part of the locking mechanism 198. In this regard, the locking mechanism 198 may further include a through bore 200 in the top and bottom walls 194, 196 of the bracket 186. In this way, as the wheel converting mechanism 50 is being inserted into the bracket 186 toward the retracted position, the spring pin 160 of the wheel converting mechanism 50 will become generally aligned with one of the through bores 200 in the bracket 186. When so aligned, the spring pin 160 will snap through the through bore 200 under spring bias such that the spring pin 160 extends through the through bore 200 and the button 162 is positioned above the top or bottom wall 194, 196 of the bracket 186 (e.g., see left leg 42 in FIG. 4A). This engagement longitudinally locks the relative position of the wheel converting mechanism 50 and the bracket 186. Accordingly, when in the retracted position, the wheel converting mechanism 50 is fixedly secured to the bracket 186 such that the rear wheel 44 is secured to the child vehicle 10.

For sake of description, the rear wheel 44 is illustrated as initially being on the inboard side of the leg 42. To convert the child vehicle 10, the rear wheel 44 will be repositioned so as to be outboard of its respective leg 42. The description will be provided for only one of the wheels 44. Those of ordinary skill in the art will understand how to move the other wheel so as to convert the vehicle 10. To this end, the wheel converting mechanism 50 may be longitudinally withdrawn from the bracket 186 by a certain amount to reach the extended position (e.g., see right leg 42 in FIG. 4A). This may be achieved, for example, by pulling the rear wheel 44 in a longitudinal direction defined by longitudinal axis 188 away from the bracket 186. Of course to do this, the locking mechanism 198 may be disengaged prior to moving the wheel converting mechanism 50 to its extended position. For example, a parent, guardian, etc. may depress the button 162 of the spring pin 160 inwardly such that the spring pin 160 no longer extends through the though bore 200 in the bracket 186, thereby releasing the wheel converting mechanism 50 for longitudinal movements.

Figure 4B:
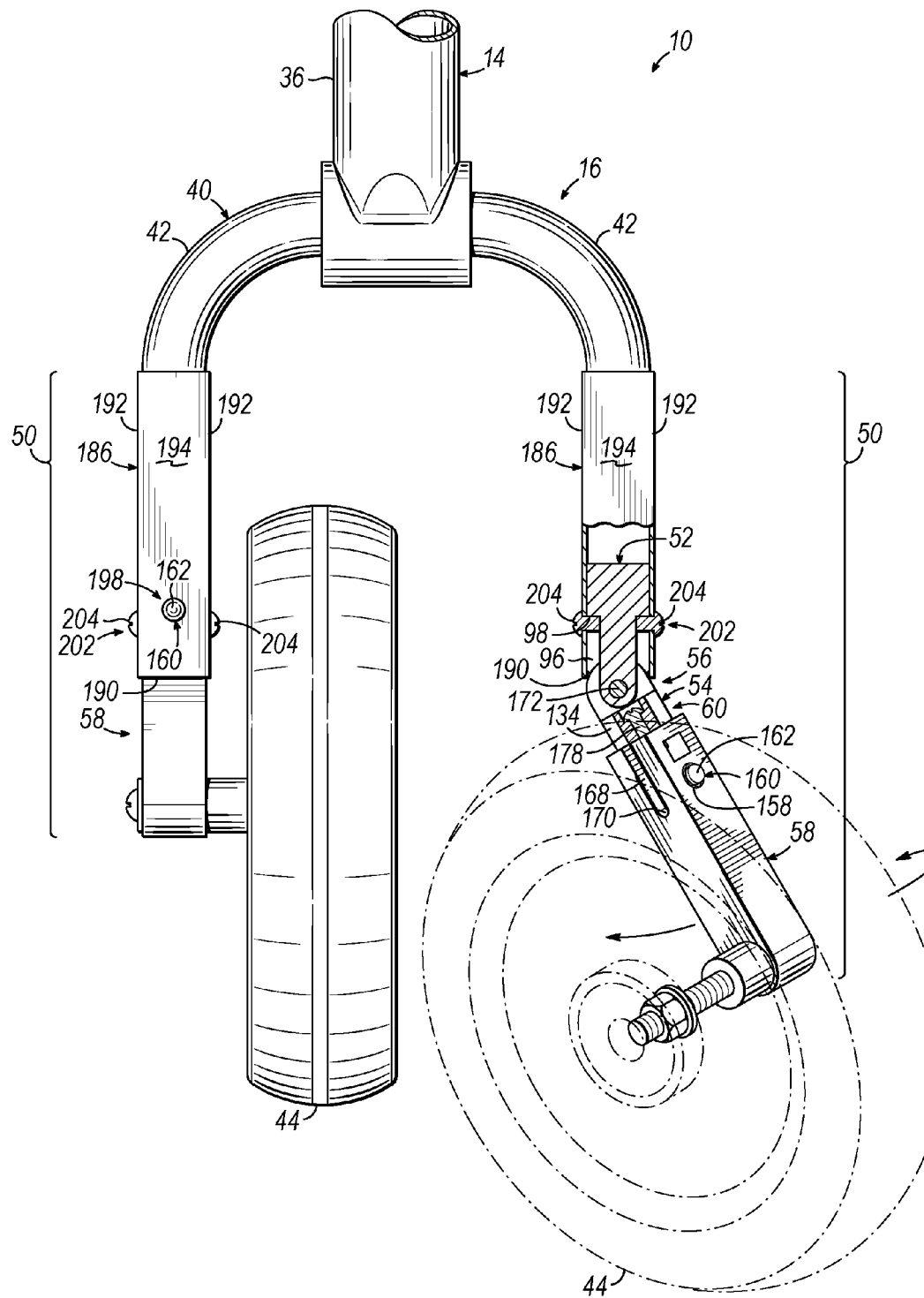
FIG. 4B is another rear view of the child vehicle being converted to a tricycle configuration using the wheel converting mechanism.

As noted above, when moving the wheel converting mechanism 50 toward the extended position, it is undesirable to completely remove the wheel converting mechanism 50 from the bracket 186, such that the rear wheel 44 is no longer coupled to the vehicle 10. Accordingly, a retention mechanism 202 may be used to prevent the wheel converting mechanism 50 from being completely removed from the bracket 186. In this regard, the retention mechanism 202 may include a projecting part, such as a key or pin 204 configured to project into the passage of the bracket 186. In one embodiment, and by way of example, the pin 204 may be provided by a screw inserted through a through bore 206 in a side wall 192 of the bracket 186. Those of ordinary skill in the art may recognize pins or keys in accordance with the invention. In any event, a portion of the pin 204 extends into the passage of the bracket 186 and is received within the grooves 96, 134, 168 of the wheel converting mechanism 50 (e.g. the grooves 96, 134, 168 operate as a keyway for pin 204). In one embodiment, there are two such pins 204, one through each of the side walls 192 of the bracket 186. As the wheel converting mechanism 50 is being withdrawn from the bracket 186, the pin 204 traverses a path defined by the grooves 96, 134, 168 until the pin 204 contacts the first stop wall 98 of the groove 96 in the base member 52 of the wheel converting mechanism 50 (e.g., see the right leg 42 in FIG. 4B). This contact prevents the wheel converting mechanism 50 from being completely removed from the bracket 186, therefore maintaining the wheel 44 in coupled relation to the vehicle 10.

As noted above, the wheel converting mechanism 50 has an extended position when it has been longitudinally withdrawn from the bracket 186. While the retention mechanism 202 prevents the complete removal of the wheel converting mechanism 50 from the bracket 186, the extended position may be defined at least when the hinge joint 56 (e.g., at least the pivot axis 176 thereof) is disposed outside of the bracket 186. For example, the pin 204 may be configured to contact the stop wall 98 when the pivot joint 56 is adjacent, but outside the open end 190 of the bracket 186. When in the extended position, the hinge member 54 (and the swivel member 58 attached thereto) is able to pivot about the pivot axis 176 from the straight position to the angled position (e.g., see right leg 42 in FIG. 4B). In this regard, the pivot direction depends on which rear wheel 44 is being moved. In any event, the hinge member 54 (and attached swivel member 58) should be pivoted about the pivot axis 176 in the outboard direction of the child vehicle 10. This pivoting of the wheel converting mechanism moves the selected rear wheel 44 in a direction generally away from the other rear wheel 44 of the vehicle 10. This essentially creates an increased amount of space between the two rear wheels 44, thereby permitting larger wheels to be used with this concept of convertible child vehicles.

Figure 4C:
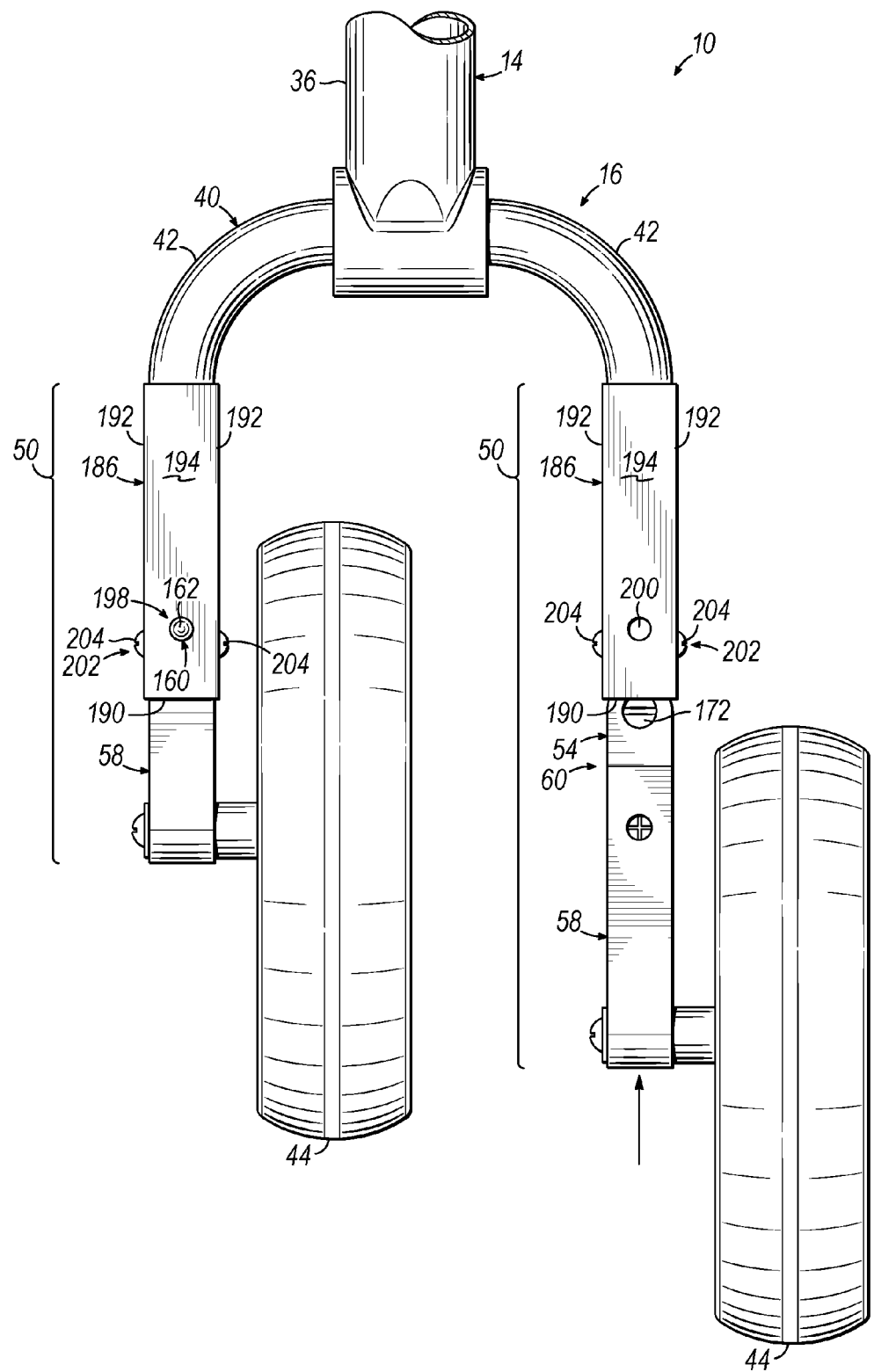
FIG. 4C is another rear view of the child vehicle being converted to a tricycle configuration using the wheel converting mechanism.
Figure 4D:
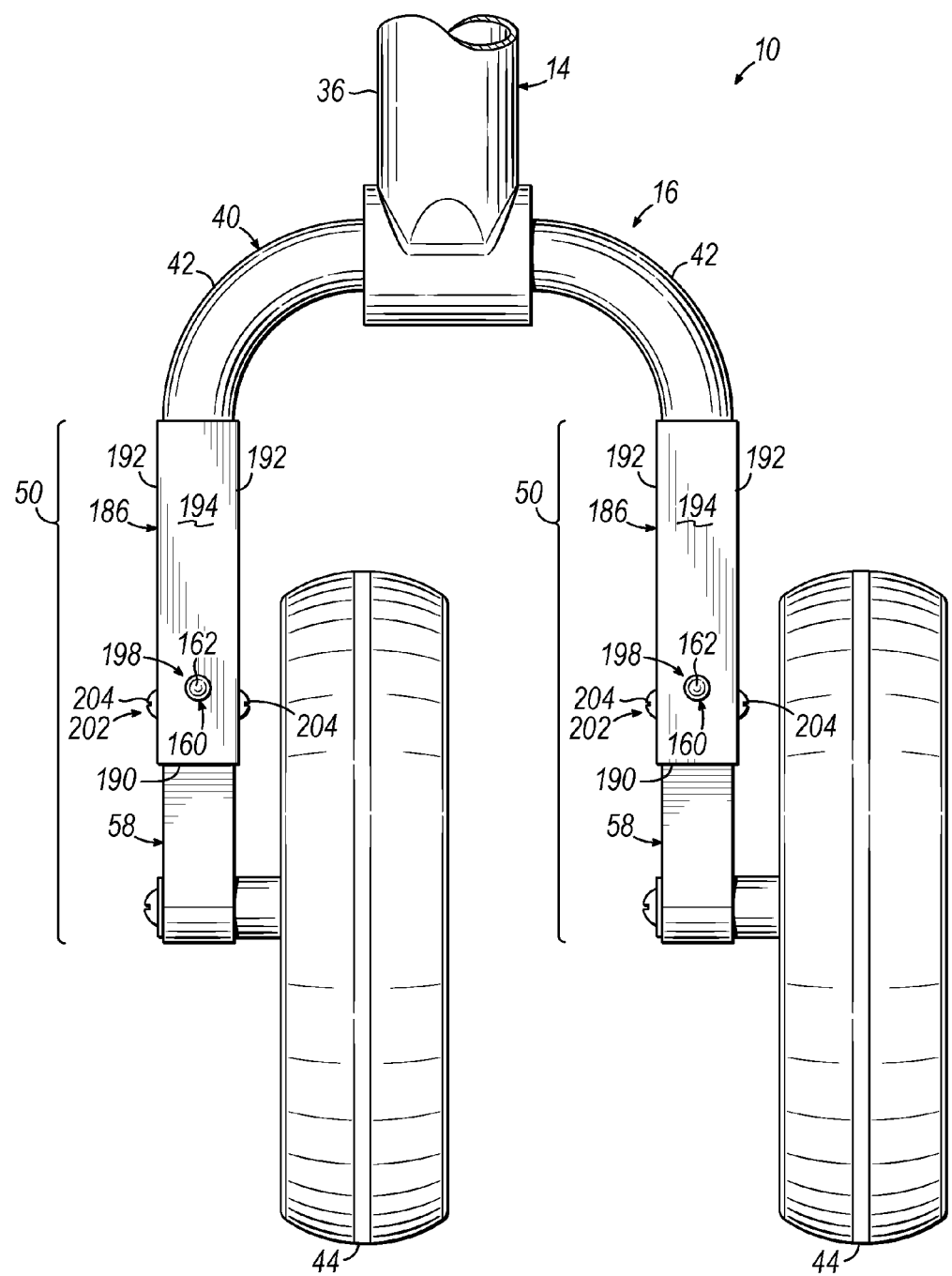
FIG. 4D is another rear view of the child vehicle being converted to a tricycle configuration using the wheel converting mechanism.

As noted above, the hinge member 54 and the swivel member 58 carried thereby may be pivoted through a sufficiently large angle (generally less than about 90° (e.g., 30°, 45°, or 60°) relative to the base member 52. After the rear wheel 44 has been pivoted in the outboard direction, the swivel member 58 may be rotated about swivel axis 180. The swivel member 58 (and the rear wheel 44 which it carries) may be rotated in either direction and may be rotated about 180° such that the rear wheel 44 is now positioned on the opposite side of the swivel member 58 from which it initially started. Subsequent to rotating the swivel member 58 about the swivel axis 180, the hinge member 54 and swivel member 58 carried thereby may be pivoted from the angled position back to its straight position relative to the base member 52, as illustrated in FIG. 4C. With the hinge member 54 and swivel member 58 in the straight position, the wheel converting mechanism 50 may be moved in the longitudinal direction from its extended position to its retracted position back into the bracket 186, as illustrated in FIG. 4D. As the wheel converting mechanism 50 moves, the pins 204 traverse the grooves 96, 134, 168 in the base member 52, hinge member 54 and swivel member 58, respectively (albeit the grooves 168 of the swivel member 58 have an opposite arrangement). The wheel converting mechanism 50 may move longitudinally into the bracket 186 until the button 162 of the spring pin 160 snaps back through a through bore 200 on the bracket 186, thereby once again locking the wheel converting mechanism 50 to the bracket 186 and securing the rear wheel 44 to the child vehicle 10. This may occur simultaneous with or prior to the pin 204 contacting the second stop wall 170 of the groove 168.

As can be seen in FIGS. 4A-4D, the rear wheel 44, which initially started on the inboard side of the leg 42, is now on the outboard side of the leg 42 of the rear fork 40. This steps described above can be repeated for the second wheel 44 of the child vehicle 10 to move the second wheel 44 from the inboard side of the leg 42 to the outboard side of the leg 42. When this is completed for both the first and second rear wheels 44, the vehicle 10 has been converted from a bicycle configuration to a tricycle configuration. Of course, to convert the child vehicle 10 from a tricycle configuration to the bicycle configuration, the steps above can be repeated for both of the rear wheels, but rotating the wheels 44 from the outboard side of the legs 42 to the inboard side of the legs 42. Additionally, while the child vehicle 10 shown and described herein included only a rear fork 40 having wheels capable of moving between the inboard side and outboard side of their respective fork legs, it should be appreciated that in an alternative embodiment, a child vehicle may include a front fork having such movable wheels (with a fixed rear wheel or wheels) or a child vehicle having both a front fork and a rear fork having such movable wheels.

While the embodiment described above was directed to a scenario where it was advantageous to pivot the swivel member 58 about the pivot axis 176 in an outboard direction so as to create space that allows the wheel 44 to rotate without undue interference, the invention is not so limited. In this regard, the pivotal movement of the swivel member 58 may not be necessary in certain applications in order to move a wheel from the inboard side of the forks to the outboard side of the forks (or vice versa). For example, in situations where the wheel is relatively small, pivotal movement of the swivel member 58 may not be necessary. Moreover, in situations where the forks are spaced apart a sufficient amount, it may not be necessary to pivot the swivel member 58 about the swivel axis 176 in order to rotate the wheels relative to the forks. In these cases, the wheel converting mechanism 50 may be extended from the bracket 186 such that the swivel joint 60 is disposed outside of the bracket 186. In the extended position, the swivel member 58 may be rotated about swivel axis 180. The swivel member 58 (and the rear wheel 44 which it carries) may be rotated in either direction and may be rotated about 180° such that the rear wheel 44 is now positioned on the opposite side of the swivel member 58 from which it initially started. With the swivel member 58 in the straight position, the wheel converting mechanism 50 may be moved in the longitudinal direction from its extended position to its retracted position back into the bracket 186. Thus, in some alternative embodiments, wheel conversion may take place without pivoting the swivel member 58 about the pivot axis 176.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A wheel converting mechanism for a child vehicle having a wheel, comprising:
   an elongate body including a first portion, a second portion, and a third portion; and
   a retention mechanism configured to retain the wheel converting mechanism to the child vehicle, the retention mechanism comprising:
      at least one groove formed in at least one of the first, second, and third portions of the wheel converting mechanism; and
      a pin configured to be received in and traverse the groove in the at least one of the first, second, and third portions,
   wherein the third portion of the elongate body is configured to be coupled to the wheel of the child vehicle;
   wherein the first portion and the second portion are coupled together through a pivot joint that allows the second portion to pivot relative to the first portion about a pivot axis defined by the pivot joint; and
   wherein the second portion and third portion are coupled together through a swivel joint that allows the third portion to rotate relative to the second portion about a swivel axis defined by the swivel joint, wherein the swivel axis and the pivot axis are not parallel to each other.

2. The wheel converting mechanism according to claim 1, wherein the cross-sectional shape of each of the first, second, and third portions is non-circular.

3. A wheel converting mechanism for a child vehicle having a wheel, comprising:
    an elongate body including a first portion, a second portion, and a third portion, wherein the third portion of the elongate body is configured to be coupled to the wheel of the child vehicle;
    wherein the first portion and the second portion are coupled together through a pivot joint that allows the second portion to pivot relative to the first portion about a pivot axis defined by the pivot joint;
    wherein the second portion and third portion are coupled together through a swivel joint that allows the third portion to rotate relative to the second portion about a swivel axis defined by the swivel joint, wherein the swivel axis and the pivot axis are not parallel to each other; and
    wherein a groove is formed in each of the first, second, and third portions of the wheel converting mechanism, the wheel converting mechanism having a position wherein the grooves in each of the first, second, and third portions are generally aligned.

4. The wheel converting mechanism according to claim 1, wherein the second portion is pivotal relative to the first portion about the pivot axis between a first position and a second position, wherein when in the first position a first longitudinal axis of the first portion is generally aligned with a second longitudinal axis of the second portion, and wherein when in the second position, the second longitudinal axis is angled relative to the first longitudinal axis so as to be in non-parallel relation.

5. The wheel converting mechanism according to claim 4, wherein the angle between the first and second longitudinal axes when in the second position is less than about 60°.

6. The wheel converting mechanism according to claim 1, wherein the third portion is rotatable relative to the second portion about the swivel axis between a first position and a second position, wherein when in the first position the wheel is on a first side of the second portion, and wherein when in the second position, the wheel is on a second side of the second portion opposite to the first side.

7. The wheel converting mechanism according to claim 6, wherein the third portion may be rotated away from the first position in either a first rotating direction or a second rotating direction opposite to the first rotating direction.

8. The wheel converting mechanism according to claim 3, wherein the groove formed in the first portion of the wheel converting mechanism includes an end wall.

9. A wheel converting mechanism for a child vehicle having a wheel, comprising:
    an elongate body including a first portion, a second portion, and a third portion, wherein the third portion of the elongate body is configured to be coupled to the wheel of the child vehicle;
    wherein the first portion and the second portion are coupled together through a pivot joint that allows the second portion to pivot relative to the first portion about a pivot axis defined by the pivot joint;
    wherein the second portion and third portion are coupled together through a swivel joint that allows the third portion to rotate relative to the second portion about a swivel axis defined by the swivel joint, wherein the swivel axis and the pivot axis are not parallel to each other;
    wherein the second portion is pivotal relative to the first portion about the pivot axis between a first position and a second position, wherein when in the first position a first longitudinal axis of the first portion is generally aligned with a second longitudinal axis of the second portion, and wherein when in the second position, the second longitudinal axis is angled relative to the first longitudinal axis so as to be in non-parallel relation and the angle between the first and second longitudinal axes when in the second position is less than about 60'; and
    wherein the second portion may be pivoted away from the first position in either a first pivoting direction or a second pivoting direction opposite to the first pivoting direction.

10. A wheel converting mechanism for a child vehicle having a wheel, comprising:
    an elongate body including a first portion, a second portion, and a third portion, wherein the third portion of the elongate body is configured to be coupled to the wheel of the child vehicle;
    wherein the first portion and the second portion are coupled together through a pivot joint that allows the second portion to pivot relative to the first portion about a pivot axis defined by the pivot joint; and
    wherein the second portion and third portion are coupled together through a swivel joint that allows the third portion to rotate relative to the second portion about a swivel axis defined by the swivel joint, wherein the third portion is rotatable relative to the second portion about the swivel axis between a first position and a second position, wherein when in the first position the wheel is on a first side of the second portion, and wherein when in the second position, the wheel is on a second side of the second portion opposite to the first side, wherein the third portion is rotated through an angle of approximately 180° between the first position and second position.

11. A wheel converting mechanism for a child vehicle having a wheel, comprising:
    an elongate body including a first portion, a second portion, and a third portion; and
    a locking mechanism, the locking mechanism including a depressible spring pin projecting from a surface of the wheel converting mechanism,
    wherein the third portion of the elongate body is configured to be coupled to the wheel of the child vehicle;
    wherein the first portion and the second portion are coupled together through a pivot joint that allows the second portion to pivot relative to the first portion about a pivot axis defined by the pivot joint; and
    wherein the second portion and third portion are coupled together through a swivel joint that allows the third portion to rotate relative to the second portion about a swivel axis defined by the swivel joint, wherein the swivel axis and the pivot axis are not parallel to each other.

12. A child vehicle having a wheel, comprising:
    at least one frame including a bracket;
    a wheel converting mechanism coupled to the bracket of the at least one frame and configured to reposition the wheel relative to the at least one frame, the wheel converting mechanism comprising:

an elongate body including a first portion, a second portion, and a third portion, wherein the third portion of the elongate body is coupled to the wheel of the child vehicle;

wherein the first portion and the second portion are coupled together through a pivot joint that allows the second portion to pivot relative to the first portion about a pivot axis defined by the pivot joint; and wherein the second portion and third portion are coupled together through a swivel joint that allows the third portion to rotate relative to the second portion about a swivel axis defined by the swivel joint, wherein the swivel axis and the pivot axis are not parallel to each other; and a retention mechanism configured to retain the wheel converting mechanism to the child vehicle, the retention mechanism comprising:

at least one groove formed in at least one of the first, second, and third portions of the wheel converting mechanism; and a pin coupled to the bracket and received in the groove in the at least one of the first, second, and third portions, wherein the pin is configured to engage an end wall of the groove to prevent the wheel converting mechanism from separating from the bracket.

13. The child vehicle according to claim 12, wherein the wheel converting mechanism is movable between a first position and a second position relative to the bracket, wherein when in the first position, the wheel is on a first side of the bracket, and when in the second position, the wheel is on a second side of the bracket opposite to the first side.

14. The child vehicle according to claim 12, wherein the wheel converting mechanism is configured to reposition the wheel without separating the wheel converting mechanism from the vehicle.

15. A child vehicle having a wheel, comprising:
at least one frame including a bracket; and
a wheel converting mechanism coupled to the bracket of the at least one frame and configured to reposition the wheel relative to the at least one frame, the wheel converting mechanism comprising:

an elongate body including a first portion, a second portion, and a third portion, wherein the third portion of the elongate body is coupled to the wheel of the child vehicle;

wherein the first portion and the second portion are coupled together through a pivot joint that allows the second portion to pivot relative to the first portion about a pivot axis defined by the pivot joint; and wherein the second portion and third portion are coupled together through a swivel joint that allows the third portion to rotate relative to the second portion about a swivel axis defined by the swivel joint;

wherein the bracket includes a hollow tube and the wheel converting mechanism is at least partially telescopingly received within the hollow tube.

16. A child vehicle having a wheel, comprising:
at least one frame including a bracket; and
a wheel converting mechanism coupled to the bracket of the at least one frame and configured to reposition the wheel relative to the at least one frame, the wheel converting mechanism comprising:

an elongate body including a first portion, a second portion, and a third portion, wherein the third portion of the elongate body is coupled to the wheel of the child vehicle;

wherein the first portion and the second portion are coupled together through a pivot joint that allows the second portion to pivot relative to the first portion about a pivot axis defined by the pivot joint;

wherein the second portion and third portion are coupled together through a swivel joint that allows the third portion to rotate relative to the second portion about a swivel axis defined by the swivel joint, wherein the swivel axis and the pivot axis are not parallel to each other; and wherein the wheel converting mechanism is moveable relative to the bracket between a first position and a second position, wherein when in the first position, the swivel joint is located within the bracket, and when in the second position, the pivot joint is located outside of the bracket.

17. The child vehicle according to claim 16 further comprising a locking mechanism for securing the wheel converting mechanism in the first position, the locking mechanism comprising:

a depressible spring pin projecting from a surface of the wheel converting mechanism; and at least one bore in the bracket, wherein a portion of the spring pin projects through the at least one bore to secure the wheel converting mechanism in the first position.

18. A child vehicle having a wheel, comprising:
at least one frame including a bracket; and
a wheel converting mechanism coupled to the bracket of the at least one frame and configured to reposition the wheel relative to the at least one frame, the wheel converting mechanism comprising:

an elongate body including a first portion, a second portion, and a third portion, wherein the third portion of the elongate body is coupled to the wheel of the child vehicle;

wherein the first portion and the second portion are coupled together through a pivot joint that allows the second portion to pivot relative to the first portion about a pivot axis defined by the pivot joint;

wherein the second portion and third portion are coupled together through a swivel joint that allows the third portion to rotate relative to the second portion about a swivel axis defined by the swivel joint, wherein the swivel axis and the pivot axis are not parallel to each other; and wherein the at least one frame includes a fork having a first leg and a second leg, the first leg having a first bracket and the second leg having a second bracket, the child vehicle further comprising a first wheel converting mechanism having a first wheel coupled to the first bracket and a second wheel converting mechanism having a second wheel coupled to the second bracket.

19. The child vehicle according to claim 18, wherein the fork includes a rear fork of the child vehicle.

20. A method of moving a wheel of a child vehicle, comprising:

moving a wheel converting mechanism relative to a bracket of the child vehicle, the wheel converting mechanism having a first, second, and third portion, wherein the wheel is coupled to the third portion;

pivoting the second portion of the wheel converting mechanism relative to the first portion about a pivot axis defined at a pivot joint between the first and second portions; and rotating the third portion of the wheel converting mechanism relative to the second portion about a swivel axis defined at a swivel joint between the second and third portions, wherein the swivel axis and the pivot axis are not parallel to each other, wherein the wheel converting mechanism is moveable relative to the bracket between a first position and a second position, wherein when in the first position, the swivel joint is located within the bracket, and when in the second position, the pivot joint is located outside of the bracket.

21. A method of converting a child vehicle from a first configuration to a second configuration, the child vehicle having a fork with a first leg having a first bracket and a second leg having a second bracket, the child vehicle having a first wheel and a second wheel coupled to a respective brackets by a first wheel converting mechanism and a second wheel converting mechanism, each wheel converting mechanism having a first, second, and third portion, wherein the wheel is coupled to the third portion, the method comprising:

moving the first wheel converting mechanism relative to the first bracket of the child vehicle;

pivoting the second portion of the first wheel converting mechanism relative to the first portion of the first wheel converting mechanism about a pivot axis defined at a pivot joint between the first and second portions;

rotating the third portion of the first wheel converting mechanism relative to the second portion of the first wheel converting mechanism about a swivel axis defined at a swivel joint between the second and third portions, wherein the swivel axis and the pivot axis are not parallel to each other;

again pivoting the second portion of the first wheel converting mechanism relative to the first portion of the first wheel converting mechanism about the pivot axis; and again moving the first wheel converting mechanism relative to the bracket of the child vehicle.

22. A wheel converting mechanism for a child vehicle, the child vehicle having a bracket and having a wheel coupled to the bracket by the wheel converting mechanism, comprising:

an elongate body including a first portion, a second portion, and a third portion, wherein the third portion of the elongate body is configured to be coupled to the wheel of the child vehicle;

wherein the first portion and the second portion are coupled together through a first joint that allows the second portion to move relative to the first portion about a first axis;

wherein the second portion and third portion are coupled together through a second joint that allows the third portion to move relative to the second portion about a second axis, wherein the first axis and the second axis are not parallel to each other; and wherein the wheel converting mechanism is moveable relative to the bracket between a first position and a second position, wherein when in the first position, the second joint is located within the bracket, and when in the second position, the first joint is located outside of the bracket.

23. A method of moving a first wheel of a child vehicle having the first wheel and a second wheel adjacent each other using a wheel converting mechanism having a first, second, and third portion, wherein the first wheel is coupled to the third portion and the first wheel is coupled to a bracket by the wheel converting mechanism, comprising:

moving the second portion of the wheel converting mechanism relative to the first portion about a first axis defined by a first joint between the first and second portions to increase the spacing between the first and second wheels; and moving the third portion of the wheel converting mechanism relative to the second portion about a second axis defined by a second joint between the second and third portions when the spacing between the first and second wheels has been increased, wherein the first axis and the second axis are not parallel to each other, wherein the wheel converting mechanism is moveable relative to the bracket between a first position and a second position, wherein when in the first position, the second joint is located within the bracket, and when in the second position, the first joint is located outside of the bracket.

* * * * *

UNITED STATES PATENT AND TRADEMARK OFFICE
CERTIFICATE OF CORRECTION

PATENT NO. : 9,254,884 B2
APPLICATION NO. : 14/206528
DATED : February 9, 2016
INVENTOR(S) : Donald K. Jessie, Jr. et al.

It is certified that error appears in the above-identified patent and that said Letters Patent is hereby corrected as shown below:

In the Specification:

Column 1, line 56, change "manufactures" to --manufacturers--.

Column 2, line 36, change "of" to --or--.

Column 3, line 11, change "an" to --and--.

Column 3, line 15, change "are" to --is--.

Column 3, line 19, after "may" insert --be--.

Column 3, line 26, after "longitudinal" insert --axis--.

Column 3, line 36, change "portion" to --position--.

Column 3, line 57, change "from" to --frame--.

Column 4, line 24, change "mechanisms" to --mechanism--.

Column 4, line 57, change "is" to --are--.

Column 5, line 53, change "portion" to --position--.

Column 5, line 56, after "from the" insert --second--.

Column 6, line 3, change "portion" to --position--.

Column 6, line 6, after "from the" insert --second--.

Column 6, line 30, after "is" insert --a--.

Column 8, line 50, after "of the" delete "of the".

Signed and Sealed this
Twenty-third Day of August, 2016

Michelle K. Lee
*Director of the United States Patent and Trademark Office*

CERTIFICATE OF CORRECTION (continued)
U.S. Pat. No. 9,254,884 B2

Column 15, line 54, change "This" to --The--.

In the Claims:

Column 18, claim 9, line 14, change "60'" to --60°--.

Column 21, claim 21, line 14, after "to" delete "a".